Figure 1:
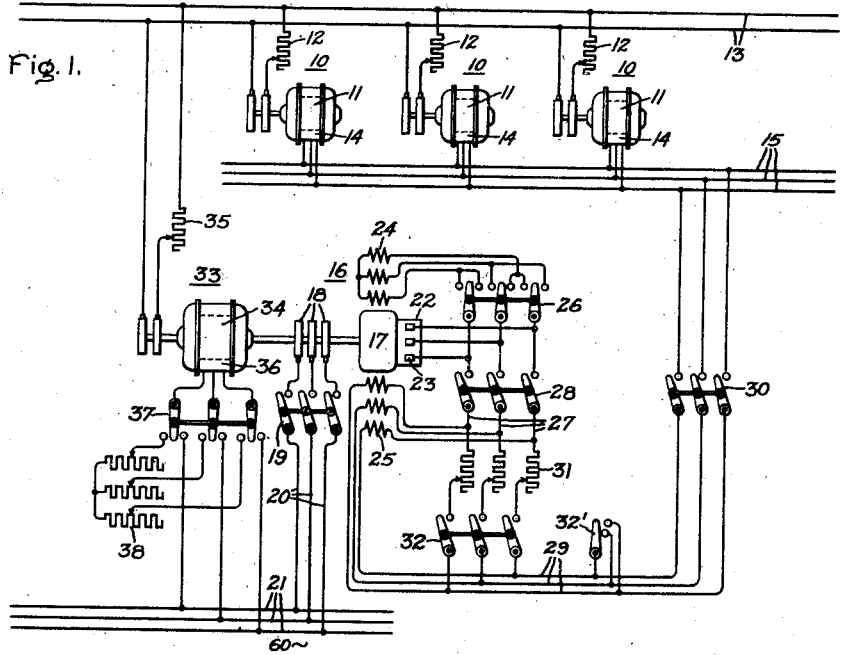

March 14, 1933.  J. I. HULL  1,901,650

SPEED CONTROL

Filed Jan. 7, 1931

Inventor:
John I. Hull,
by Chas. E. Tullar
His Attorney.

Patented Mar. 14, 1933

1,901,650

UNITED STATES PATENT OFFICE

JOHN I. HULL, OF SWAMPSCOTT, MASSACHUSETTS, ASSIGNOR TO GENERAL ELECTRIC COMPANY, A CORPORATION OF NEW YORK

SPEED CONTROL

Application filed January 7, 1931. Serial No. 507,211.

My invention relates to the speed control of electric motors and its principal object is to provide a method of operating a group of synchronized alternating current motors from a variable frequency source whereby the motors will operate at variable synchronized speeds during their entire speed range with a locking torque in the motors at zero speed. An additional object of my invention is to provide a frequency changer for supplying to the motors a variable frequency voltage having the necessary characteristics for making possible my method of operation. Additional objects of my invention will be mentioned during the progress of this specification.

The usual variable frequency source for operating alternating current motors supplies a voltage whose magnitude is substantially directly proportional to the frequency with zero voltage at zero frequency. When a group of synchronized alternating current motors are connected to such a source the motor speeds are varied by varying the frequency and the synchronizing torque between the motors maintains a fixed relationship between the speeds of the motors. It is obvious that at zero speed of the motors there will be zero voltage impressed on their primary windings, thus resulting in zero motor torques.

It is frequently desirable to drive a group of synchronized alternating current motors at variable speed from a variable frequency source with a locking torque in the motors at standstill. One example where such a drive is desirable is a sectionalized printing press having its various sections driven by a group of synchronized alternating current motors with each section driven by a separate motor. It is desirable to operate this group of motors at synchronized speeds from maximum speed to standstill and with a locking torque in the motors at standstill to prevent a change in the fixed relationship that existed between the various sections during operation, thus preserving this fixed relationship when the press is restarted. If this group of motors are operated from the usual variable frequency source there will be no locking torque in the motors at standstill. My invention overcomes this objection by operating the group of motors from a variable frequency source having one voltage component which is substantially directly proportional to the frequency for overcoming the reactive drop and counter electromotive force of the motor primary windings and another voltage component having a substantially constant value for overcoming the resistance drop in the primary windings, the latter voltage component producing the locking torque in the motors at standstill. I also provide a frequency changer supplying a variable frequency voltage having these two voltage components.

My invention will however be best understood from the following description when considered in connection with the accompanying drawing while those features of my invention which are believed to be novel and patentable are pointed out in the claims appended hereto.

Figure 2:
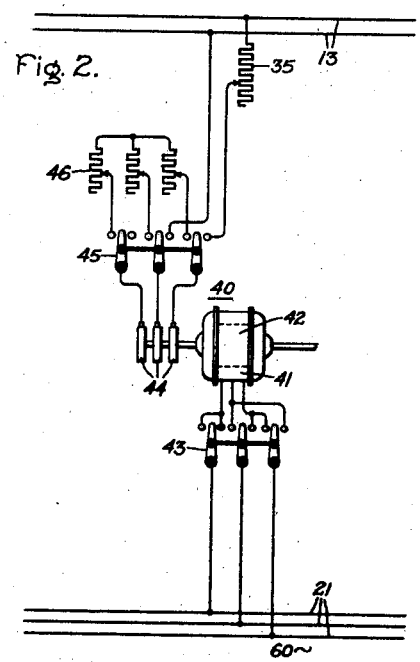
Figure 3:
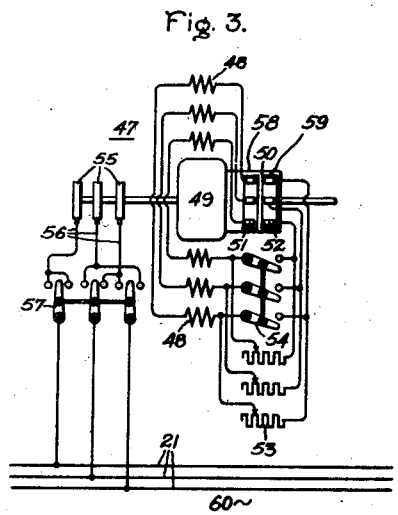

Fig. 1 represents a group of synchronous motors having their primary windings supplied with current from a frequency changer delivering the two voltage components contemplated by my invention. In this figure a synchronous motor capable of also operating as a generator is coupled to the frequency changer for varying the speed of the latter from maximum to substantially zero speed, thus obtaining the desired variation in frequency. Figs. 2 and 3 are similar to Fig. 1 except that the synchronous motor coupled to the frequency changer in Fig. 1 is replaced by an induction motor in Fig. 2 and by a brush shifting alternating current motor in Fig. 3, and hence only these motors are illustrated in Figs. 2 and 3 respectively. In Figs. 2 and 3 the frequency changer may be operated at variable speed in either direction to obtain a larger variation in frequency and thus give the motors operated from the frequency changer a larger range of speed than those in Fig. 1.

In Fig. 1, 10 represents each of a group of three phase synchronous motors each of which drives a printing press section (not shown). The motors 10 have field windings 11 connected through adjustable resistances 12 to a direct current source 13. The motors 10 have their primary windings 14 connected in parallel to lines 15. A frequency changer 16 comprises a rotatable member 17 having a primary winding and a commutated winding, these being preferably separate windings although they may constitute one winding. The primary winding on the rotatable member 17 is connected to collector rings 18 and the latter may be connected through switch 19 and leads 20 to an alternating current source 21 having a substantially constant voltage and frequency. The source 21 is preferably shown as three-phase and is for illustration assumed to have a frequency of 60 cycles. The commutated winding on the rotatable member 17 is connected to a commutator 22 on which rest brushes 23. The frequency changer 16 has stationary secondary windings 24 and 25. One set of ends of the winding 24 are connected in Y and the other set of ends may be connected to the commutator brushes by a two-way switch 26 which interchanges two ends of the winding 24 when the switch is moved from one closed position to the other closed position. One set of ends of the secondary winding 25 are connected to leads 27 and these may be connected to the brushes 23 by closing a switch 28. The other set of ends of the winding 25 may be connected through leads 29 and switch 30 to the lines 15. Across the leads 27 and 29 and in shunt with the windings 25 are connected adjustable resistances 31 in series with a switch 32. A short circuiting switch 32' is connected across the leads 29. A self-starting synchronous motor 33 has a rotatable member 34 coupled to the rotatable member 17, the member 34 being preferably shown as the field windings connected through adjustable resistances 35 to the source 13. The synchronous motor 33 has primary windings 36 which may be connected by a two-way switch 37 to adjustable resistances 38 or to the source 21.

To simplify the description of the operation of my invention, assume that 16 and 33 have the same synchronous speeds. Also assume that it is desired to operate the motors 10 from standstill to the speeds they would have with a voltage having a frequency of 60 cycles supplied to their primary windings. Also, assume that the printing press sections driven by the motors 10 are now in their correct relative positions. A brief description of the operation of my invention follows: Close switch 28. The frequency changer 16 may be brought to its synchronous speed by the synchronous motor 33 by closing the switch 37 to the right. Close switches 19 and 30. It is obvious that at synchronous speed there is no induced voltage in winding 25 but that there is a direct current E. M. F. between the brushes 23 and direct current will flow through the windings 14. The flow of direct current in both members of the motors 10 causes them to have a locking torque at standstill, thus preventing any change in the relative positions of the various printing press sections. To bring the motors 10 into motion with fine and smooth control over their speeds and maintain a fixed relationship between their speeds it is desirable to supply their primary windings 14 with a variable frequency voltage, thus requiring 16 to operate at varying slip from synchronism for delivering this variable frequency voltage. It is also desirable that this variable frequency voltage have suitable characteristics to maintain at all motor speeds a substantially constant flow of current in each winding 14 so that each motor will have a substantially constant torque for a given setting of 12, the value of the torque being that necessary to rotate the particular section driven by the motor.

Before describing how the speed of the frequency changer is varied it is desirable to explain how it produces the variable frequency voltage with suitable characteristics as its speed is varied. The operation of 16 away from synchronism causes a voltage to be induced in winding 25, the value of this voltage being substantially directly proportional to the slip of 16 from synchronism and the frequency of this voltage being directly proportional to this slip. The induced voltage between the brushes 23 has a substantially constant value irrespective of this slip, whereas its frequency is directly proportional to this slip. The voltage between the brushes 23 and the induced voltage in 25 have the same frequency and it is satisfactory to connect the commutated winding on the member 17 in series with the winding 25, this being accomplished through the brushes 23 and the switch 28. It is obvious that if the speed of 16 is varied it will impress on the primary windings 14 a variable frequency voltage having one component whose value is substantially constant and another component whose value is substantially directly proportional to the frequency impressed on windings 14. By suitable selection of the relative positions of the brushes 23 and the secondary windings 25 and suitable choice of the windings 14, the voltage component having a substantially constant value will balance the resistance drop in the windings 14 and the voltage component which is substantially directly proportional to the frequency impressed on windings 14 will balance the reactive drop and the counter electromotive force in the windings 14. This causes a substantially constant flow of current in each primary winding 14 at all speeds including zero speed and results in each motor 10 having a substantially constant torque at all speeds including a locking torque at standstill.

Assume switch 37 closed to the right, and switches 19, 28 and 30 closed. The frequency changer 16 will operate at synchronous speed and the motors 10 will be at standstill with a locking torque in each motor. The motors 10 are brought into motion and their speed controlled in the following manner. Close switch 37 to the left and 33 acts as a generator supplying current to 38, the value of this current depending on the speed of 33 and the setting of 35 and 38. It requires a motor torque to drive 33 and hence the speed of 16 decreases from synchronism, thus causing alternating current to flow through the secondary windings 25 and the frequency changer develops a motor torque. The decrease in speed of 16 decreases the current in 38 for a given setting of 35 and 38, thus reducing the motor torque required to drive 33 and the speed of 16 settles down to that value where its motor torque is sufficient to drive 33. I will assume for illustration that 16 is now running at 5% slip and therefore a voltage of 3 cycles frequency is impressed on windings 14 and the motors 10 will now run at speeds corresponding to 3 cycles. To increase the speed of 10, decrease 35 or 38, or both, so that a larger current momentarily flows through 38, thus requiring a larger motor torque to drive 33. The speed of 16 will decrease, thus decreasing the current flowing in 38 until the torque required to drive 33 equals the motor torque of 16, this motor torque being substantially constant because the current flowing in windings 25 is substantially constant. A voltage having a frequency higher than 3 cycles will now be impressed on windings 14 and the speeds of the motors 10 will be increased. By suitably adjusting 35 and 38 the speed of 16 may be decreased to nearly zero, the voltage impressed on windings 14 will have a frequency of nearly 60 cycles and the motors 10 will run at maximum speed. The speed of the motors 10 may be decreased by increasing either 35 or 38. By suitable choice of 35 and 38 the motor speeds may be varied in small increments during the entire speed range.

When 33 is not self-starting or when 33 is replaced by a different type of motor incapable of bringing 16 to synchronous speed or when for other reasons it is desired to bring 16 from standstill to synchronous speed under its own power, this may be accomplished as following. Assume all switches open, close switches 19, 28 and 32'. The frequency changer will come up to approximately synchronous speed by induction motor action. There will be a low frequency revolving flux in the winding 25 produced by the induced current flowing therein, and there will also be a low frequency voltage between the brushes 23. Close switch 26 in the proper direction so that the phase sequence of the currents flowing in winding 24 will be opposite to the phase sequence of the currents in winding 25. The flux of winding 24 tends to make 16 run with a certain amount of slip in one direction and the flux of winding 25 tends to make 16 run with about the same slip in the opposite direction. The frequency changer 16 therefore runs at synchronous speed, this being zero slip, and corresponding to midway between the opposing slip tendencies of windings 24 and 25. Open switch 32' and close switch 30, and direct current will flow through the primary windings 14 and the motors 10 will be at standstill with a locking torque in each motor. To bring the motors 10 into motion and control their speed, open switch 26, close switch 37 to the left and adjust resistances 35 and 38 as previously described.

For adjusting the rolls, type, etc., of the printing presses, the motors 10 may be operated at a substantially constant predetermined crawling speed which for example I assume corresponds to the voltage impressed on 14 having a frequency of 6 cycles and hence corresponds to 16 running with a slip of 10%. The winding 24 is designed so that when 16 runs with 10% slip the voltage induced in 24 will be substantially the same as the voltage induced in the commutated winding on the member 17. Assume that 16 has been brought to a speed of substantially 10% slip by adjustment of resistances 35 and 38 and the motors 10 run at the predetermined crawling speed. Close the switch 26 in the proper direction so that the phase sequence of currents flowing in winding 24 will be the same as the phase sequence of the currents flowing in winding 25. At the predetermined speed no current flows in 24 as its voltage is substantially equal and opposite to the voltage between the brushes 23. If 35 or 38 are moved from their correct positions and in a direction to cause a decrease in the speed of 16 the voltage induced in 24 becomes higher than the voltage between the brushes 23, thus causing a current to flow from 24 into the commutated winding connected to the brushes 23. The flow of current from 24 produces a motor torque and increases the speed of 16 to very nearly the value corresponding to 10% slip. If 35 or 38 are moved from their correct positions and in a direction to cause an increase in the speed of 16 the voltage induced in 24 becomes less than the voltage between the brushes 23, thus causing current to flow into 24 and producing a generator torque which decreases the speed of 16 to very nearly the value corresponding to 10% slip. The motors 10 will therefore be maintained at a substantially constant crawling speed providing 35 or 38 are not moved unreasonably far from their correct positions corresponding to 10% slip on 16. If 35 or 38 are moved unreasonably far from their correct positions the torque required from 24 to bring about the predetermined crawling speed may be more than the torque 24 was designed to develop. This condition can be easily avoided by opening switch 37 and then 24 will easily maintain a substantially constant predetermined crawling speed on the motors 10. It is obvious that if 26 is closed with 35 and 38 adjusted not unreasonably far from their correct positions the winding 24 will cause 10 to operate at the predetermined crawling speed. If desired the crawling speed may be obtained in the following manner without the use of 33. Assume all switches open. Close switches 19, 28 and 32' and 16 will come to approximately synchronous speed. Open switch 32', close switch 30 and close switch 26 so that the phase sequence of the currents flowing in winding 24 will be the same as the phase sequence of the currents flowing in winding 25. The previously described action of 24 will increase or decrease the speed of 16 until it reaches a value substantially corresponding to 10% slip and will then maintain this slip so that the motors 10 will run at a substantially constant predetermined crawling speed.

Assume switches 26, 32 and 32' open, switches 19, 28 and 30 closed, and switch 37 closed to the left with 35 and 38 adjusted to give at or nearly maximum speed on the motors 10. When it is desired to bring the motors 10 to standstill within a reasonably short time, close switch 37 to the right and 33 acts as motor to accelerate 16 to synchronous speed for bringing 10 to standstill. The slowing down of 10 causes them to give forth electrical energy which passes through 25 and is then returned to the source 21 through the frequency changing action of 16. This energy passing through 25 produces generator torque putting additional duty on 33, thus requiring a reasonably short time to bring 10 to standstill. To bring 10 to standstill within a much shorter time, close switch 37 to the right, close switch 32 and suitably adjust 31. The electrical energy given forth by 10 as they slow down will now preferably pass through 31 rather than through 25 where it meets the opposing voltage induced in 25 and this electrical energy is now returned to the source 21 without producing generator torque in 16. The resistances 31 and switch 32 also permit the induced voltage in 25 to circulate a current which produces a high motor torque to assist 33, thus rapidly accelerating 16 to synchronism and producing a rapid shut down of 10. If it is desired to drive the printing press sections in either direction, this may be accomplished as follows: The motor 33 is provided with a smaller number of poles than 16 and hence the synchronous speed of 33 will be higher than that of 16. It is now possible to operate 16 above, at and below synchronism. When 16 operates above synchronism 10 rotate in one direction, when 16 operates at synchronism 10 are at standstill and when 16 operates below synchronism 10 rotate in the opposite direction.

In Fig. 2, similar parts to those in Fig. 1 are represented by the same numbers. In Fig. 2, 40 represents an induction motor having a primary winding 41 and a wound secondary winding 42, the latter being preferably shown as the rotatable member coupled to the rotatable member 17. The primary winding 41 may be connected to the source 21 by a two-way switch 43 which interchanges two ends of the winding when the switch is moved from one closed position to the other closed position. The secondary winding 42 is connected to collector rings 44. A two-way switch 45 enables all of the rings 44 to be connected to adjustable resistances 46 or two of the rings 44 to be connected to the direct current source 13 in series with adjustable resistance 35.

To simplify the description, assume that it is desired to operate the motors 10 from standstill to speeds they would have with a voltage having a frequency of 120 cycles supplied to their primary windings 14. The motor 40 will have the same number of poles as 16 and hence the same synchronous speeds. Assume all switches open. Close switch 45 to the right, and close switch 43 so that 40 rotates in the same direction that 16 would rotate if started under its own power as described in connection with Fig. 1. The motor 40 will operate as a synchronous motor and 16 runs at synchronous speed. Close switches 19, 28 and 30 and the motors 10 will be at standstill with a locking torque in each motor. To bring the motors 10 into motion, adjust 46 to a high value of resistance, close switch 45 to the left and move 43 to the other closed position. The motor 40 tends to reverse its direction of rotation, thus decreasing the speed of 16 from synchronism and causing alternating current to flow through 25. The frequency changer 16 develops a motor torque opposing the torque of 40 and the speed of 16 settles at that value where the opposing torques balance. A low fequency alternating current is now supplied to 14 and the motors 10 are started. The speeds of 10 may be increased by decreasing 46, thus causing 16 to lower in speed until the opposing torques of 16 and 40 again balance. At some value of 46 the opposing torques of 16 and 40 balance at their zero speed and 16 delivers a frequency of 60 cycles and motors 10 run at speeds corresponding to 60 cycles. Further decrease of 46 causes the torque of 40 to overpower the torque of 16 and 40 acts as a motor driving 16 in the opposite direction and 16 delivers a frequency above 60 cycles. If 46 is entirely cut out, 40 will drive 16 at nearly synchronous speed in the opposite direction and the frequency supplied to 14 will be nearly 120 cycles with corresponding speeds on 10. If desired, switch 45 may be closed to the right and 40 will operate as a synchronous motor and 10 will operate at speeds corresponding to 120 cycles. It is evident that there will be a fixed relationship between the speeds of the motors 10 during the entire speed range. The speeds of the motor 10 may be decreased to standstill by reversing the above described operations. If desired 16 may be started and brought to synchronism by connecting 40 as an induction motor when first started and using winding 24 as described in connection with Fig. 1, or this may be accomplished by starting 16 under its own power and connecting 24 when 16 is up to speed. If the number of poles in 40 is less than in 16 it will be possible to drive 10 in either direction, as described in connection with Fig. 1.

In Fig. 3, similar parts to those in Fig. 1 are represented by the same numbers. In Fig. 3, 47 represents an adjustable speed, alternating current brush shifting motor, such as described in Schrage Reissue Patent 14,031, December 14, 1915. The motor 47 preferably has a stationary secondary winding 48 and a primary winding placed on a rotatable member 49 coupled to the rotatable member 17. The member 49 also has a commutated winding connected to a commutator 50 on which rest brushes 51 and 52 respectively carried by movable brush yokes 58 and 59 which may be moved manually or by any suitable means. The secondary winding 48 is connected in series with adjustable resistances 53 to the brushes 51 and 52. The resistance 53 may be short circuited by a switch 54. The primary winding on the rotatable member 49 is connected to the collector rings 55 and the latter may be connected to the source 21 through leads 56 and a two-way switch 57 which interchanges two of the leads 56 when the switch is moved from one closed position to the other closed position.

To simplify the description of operation, assume that it is desired to operate the motors 10 from standstill to speeds they would have with a voltage having a frequency of 120 cycles impressed on their primary windings 14. Also assume that 16 and 47 have synchronous speeds of 1200 R. P. M. and that 47 may be brought to zero speed by shifting its brushes 51 and 52. Assume all switches open. Close switch 57 so that 47 rotates in the same direction that 16 would rotate if started under its own power, as described in connection with Fig. 1. Close switch 54 and adjust brushes 51 and 52 so that 47 would have a no-load speed of 1200 R. P. M. Close switches 19, 28 and 30, close switch 26 in the proper direction so that 24 causes 16 to operate at synchronous speed, as described in connection with Fig. 1, and hence 16 also tends to run at 1200 R. P. M. The set 16 and 47 runs at 1200 R. P. M. and the motors 10 are at standstill with a locking torque in each motor. To bring the motors 10 into motion, move brushes 51 and 52 to give 47 a no-load speed of 1125 R. P. M. for example, open switch 26 and assume that 16 would run alone at 1175 R. P. M. The tendency of 16 to run above the no-load speed of 47 causes 16 to drive 47 as a generator and the speed of 16 decreases to that value where its torque balances the generator torque of 47. Assume that 16 now runs at 1150 R. P. M., hence a low frequency alternating current is supplied to 14 and the motors 10 are started. To increase the speed of 10, move brushes 51 and 52 to decrease the no-load speed of 47, thus increasing the generator torque of 47 and 16 will decrease in speed to decrease the generator torque of 47 to the value where it is balanced by the motor torque of 16. Move brushes 51 and 52 to give 47 a zero no-load speed and 16 will decrease in speed to about 25 R. P. M. Move switch 57 to the other closed position and 47 has a zero no-load speed in the reverse direction of rotation. Adjust brushes 51 and 52 to give 47 a non-load speed of 25 R. P. M. in the reverse rotation and 16 will be at standstill delivering 60 cycles with the motors 10 operating at speeds corresponding to 60 cycles. Move brushes 51 and 52 to increase the speed of 47 and 47 acts as a motor driving 16 in the reverse direction and 16 delivers a frequency above 60 cycles. Move brushes 51 and 52 to drive 16 at synchronous speed with the reverse direction and 16 delivers 120 cycles and the motors 10 rotate at speeds corresponding to 120 cycles. The speeds of the motors 10 may be decreased to standstill by reversing the above described operations. It is evident that as compared to operation under Figs. 1 and 2, the method of operation described in connection with Fig. 3 is more efficient since the rheostat 53 was not used during the speed control of 10 and there was no rheostat losses.

The size of 47 may be reduced as for example by designing it so that 600 R. P. M. is the minimum no-load speed obtainable by moving brushes 51 and 52, and control over the entire speed range of the motors 10 may be retained as following: Assume brushes 51 and 52 set so that 47 would have a no-load speed of 600 R. P. M. and 16 operating at 625 R. P. M. in the normal direction. Move switch 57 to the other closed position, open switch 54, adjust 53 so that 47 would have a no-load speed of 600 R. P. M. in the direction of rotation it is running and 16 continues to run at 625 R. P. M. in the normal direction. As 53 is decreased the speed of 16 decreases to zero and further decrease of 53 causes 47 to act as a motor and drive 16 in the reverse direction, and with 53 cut out 47 drives 16 at 600 R. P. M. in the reverse direction. Move brushes 51 and 52 to drive 16 at 1200 R. P. M. and 16 gives 120 cycles. It is evident that this method of operation causes a loss of energy in resistances 53 and is not as efficient as the previously described method. If it is not desired to operate the motors 10 during the speed range obtained with the use of resistances 53 they may be omitted and the operating efficiency of the set 16 and 47 improved. The motors 10 may be operated in either direction of rotation by moving brushes 51 and 52 to cause operation of 16 above and below synchronism.

I have described my invention in connection with dynamo-electric machines for varying the speed of the frequency changer to supply a variable frequency voltage to a group of synchronous motors. It is clear that other means may be used for varying the speed of the frequency changer which may be used for operating other types of alternating current motors. I have described my invention in connection with a sectionalized printing press but it is clear that my invention is applicable to any load requiring the results obtainable by the use of my method of operation. It should be obvious that the embodiments represented merely illustrate the principles of my invention and I therefore wish it understood that all modifications falling within the true spirit and scope of my invention are intended to be included within the scope of the appended claims.

What I claim as new and desire to secure by Letters Patent of the United States is:—

1. In combination, an alternating current motor having relatively rotatable windings, one of which constitutes its primary winding, and means connected to the primary winding for impressing on said primary winding a variable frequency voltage which has one component of a substantially constant value for overcoming the resistance drop in the primary winding and another component whose value is substantially directly proportional to the frequency for overcoming the reactive drop and the counter-electromotive force in the primary winding.

2. In combination, a group of synchronized alternating current motors each having relatively rotatable windings, one winding on each motor constituting its primary winding, means for connecting the primary windings in parallel with each other, and means connected to the primary windings for impressing on said primary windings a variable frequency voltage which has one component of a substantially constant value for overcoming the resistance drop in the primary windings and another component whose value is substantially directly proportional to the frequency for overcoming the reactive drop and the counter-electromotive force in the primary windings.

3. In combination, an alternating current source of substantially constant frequency, an alternating current motor having a primary winding, a frequency changer interposed between said source and said motor, the said frequency changer comprising two relatively rotatable members, one of said members having a primary winding energized by said source and a commutated winding supplying an adjustable frequency voltage whose magnitude is substantially constant, a secondary winding on the other of said members for supplying an adjustable frequency voltage whose magnitude is substantially directly proportional to the frequency, connecting means between the commutated winding, secondary winding and motor primary winding whereby both of said adjustable frequency voltages are impressed on said motor primary winding, and means for varying the speed of the rotatable member of said frequency changer.

4. In combination, an alternating current source of substantially constant frequency, an alternating current motor having a primary winding, a frequency changer interposed between said source and said motor, the said frequency changer comprising two relatively rotatable members, one of said members having a primary winding energized by said source and a commutated winding supplying an adjustable frequency voltage whose magnitude is substantially constant, a secondary winding on the other of said members for supplying an adjustable frequency voltage whose magnitude is substantially directly proportional to the frequency, connecting means between the commutated winding, secondary winding and motor primary winding whereby both of said adjustable frequency voltages are impressed on said motor primary winding, a dynamo electric machine revolving with the rotatable member of said frequency changer, and means for producing a variable generator torque in said machine for varying the speed of said rotatable member from its synchronous speed to substantially zero speed.

5. In combination, an alternating current source of substantially constant frequency, an alternating current motor having a primary winding, a frequency changer interposed between said source and said motor, the said frequency changer comprising two relatively rotatable members, one of said members having a primary winding energized by said source and a commutated winding supplying an adjustable frequency voltage whose magnitude is substantially constant, a secondary winding on the other of said members for supplying an adjustable frequency voltage whose magnitude is substantially directly proportional to the frequency, connecting means between the commutated winding, secondary winding and motor primary winding whereby both of said adjustable frequency voltages are impressed on said motor primary winding, a dynamo electric machine revolving with the rotatable member of said frequency changer, means for producing a variable generator torque in said machine for varying the speed of said rotatable member in one direction, and means for operating said machine as a motor to drive said rotatable member at an adjustable speed in the opposite direction.

6. In combination, an alternating current source of substantially constant frequency, an alternating current motor having a primary winding, a frequency changer interposed between said source and said motor, the said frequency changer comprising two relatively rotatable members, one of said members having a primary winding energized by said source and a commutated winding supplying an adjustable frequency voltage whose magnitude is substantially constant, a secondary winding on the other of said members for supplying an adjustable frequency voltage whose magnitude is substantially directly proportional to the frequency, connecting means between the commutated winding, a secondary winding and motor primary winding whereby both of said adjustable frequency voltages are impressed on said motor primary winding, and means for operating the frequency changer at a substantially constant predetermined speed other than its synchronous speed, the said means comprising another secondary winding on the other of said members connected to the commutated winding with a phase sequence having the same direction as the phase sequence of the first mentioned secondary winding.

7. In combination, an alternating current source of substantially constant frequency, an alternating current motor having a primary winding, a frequency changer interposed between said source and said motor, the said frequency changer comprising two relatively rotatable members, one of said members having a primary winding energized by said source and a commutated winding supplying an adjustable frequency voltage whose magnitude is substantially constant, a secondary winding on the other of said members for supplying an adjustable frequency voltage whose magnitude is substantially directly proportional to the frequency, connecting means between the commutated winding, secondary winding and motor primary winding, whereby both of said adjustable frequency voltages are impressed on said motor primary winding, and means for producing a torque in the frequency changer when it is operated near its synchronous speed whereby it will pull into and operate at its synchronous speed, the said means comprising means for revolving said rotatable member at approximately its synchronous speed and another secondary winding on the other of said members connected to the commutated winding with a phase sequence having a direction opposite to the phase sequence direction of the first mentioned secondary winding.

8. In combination, an alternating current source of substantially constant frequency, an alternating current motor having a primary winding, a frequency changer interposed between said source and said motor, the said frequency changer comprising two relatively rotatable members, one of said members having a primary winding energized by said source and a commutated winding supplying an adjustable frequency voltage whose magnitude is substantially constant, a secondary winding on the other of said members for supplying an adjustable frequency voltage whose magnitude is substantially directly proportional to the frequency, connecting means between the commutated winding, secondary winding and motor primary winding whereby both of said adjustable frequency voltages are impressed on said motor primary winding, an alternating current dynamo electric machine comprising two relatively rotatable members, the rotatable member of said machine revolving with the rotatable member of said frequency changer, field windings on one member of said machine, armature windings on the other member of said machine, adjustable resistances, means for energizing the field windings with direct current, and means for connecting the armature windings to said source or to said resistances.

9. In combination, an alternating current source of substantially constant frequency, an alternating current motor having a primary winding, a frequency changer interposed between said source and said motor, the said frequency changer comprising two relatively rotatable members, one of said members having a primary winding energized by said source and a commutated winding supplying an adjustable frequency voltage whose magnitude is substantially constant, a secondary winding on the other of said members for supplying an adjustable frequency voltage whose magnitude is substantially directly proportional to the frequency, connecting means between the commutated winding, secondary winding and motor primary winding whereby both of said adjustable frequency voltages are impressed on said motor primary winding, an alternating current dynamo electric machine comprising two relatively rotatable members, the rotatable member of said machine revolving with the rotatable member of said frequency changer, primary windings on one member of said machine, secondary windings on the other member of said machine, adjustable resistances connected to the last mentioned secondary windings, and connecting means between the last mentioned primary windings and said source.

10. In combination, an alternating current source of substantially constant frequency, an alternating current motor having a primary winding, a frequency changer interposed between said source and said motor, the said frequency changer comprising two relatively rotatable members, one of said members having a primary winding energized by said source and a commutated winding supplying an adjustable frequency voltage whose magnitude is substantially constant, a secondary winding on the other of said members for supplying an adjustable frequency voltage whose magnitude is substantially directly proportional to the frequency, connecting means between the commutated winding, secondary winding and motor primary winding whereby both of said adjustable frequency voltages are impressed on said motor primary winding, an alternating current dynamo electric machine comprising two relatively rotatable members, the rotatable member of said machine revolving with the rotatable member of said frequency changer, a primary winding and a commutated winding on one member of said machine, adjustable brushes on the commutator connected to the last mentioned commutated winding, a secondary winding on the other member of said machine, connecting means between said adjustable brushes and the last mentioned secondary winding, and connecting means between the last mentioned primary winding and said source.

11. The method of operating an alternating current motor at variable speed with a substantially constant value of primary current in said motor at all speeds including zero speed, the said method consisting of impressing on the primary winding of said motor a variable frequency voltage which has one component of a substantially constant value to overcome the resistance drop in the primary winding and another component whose value is substantially directly proportional to the impressed frequency to overcome the reactive drop and the counter electromotive force in the primary winding.

12. In combination, an alternating current motor having a primary winding, means for delivering a variable frequency voltage having a substantially constant magnitude, means for delivering a variable frequency voltage whose magnitude is substantially directly proportional to the frequency, the first and second mentioned means being adapted to deliver voltages having the same frequency at any instant, and connecting means between the first and second mentioned means and said primary winding for impressing on the latter the vector resultant voltage of the first and second mentioned variable frequency voltages.

13. In combination, a plurality of synchronized alternating current motors, each having a primary winding, means for delivering a variable frequency voltage having a substantially constant magnitude, means for delivering a variable frequency voltage whose magnitude is substantially directly proportional to the frequency, the first and second mentioned means being adapted to deliver voltages having the same frequency at any instant, and connecting means between the first and second mentioned means and said primary windings for impressing on the latter the vector resultant voltage of the first and second mentioned variable frequency voltages.

In witness whereof, I have hereunto set my hand this fifth day of January, 1931.

JOHN I. HULL.